Aug. 21, 1951 J. H. GUENTHER 2,564,687

PULSE TIME MODULATION

Filed March 26, 1946 3 Sheets-Sheet 1

INVENTOR
JOHN H. GUENTHER

BY M. A. Hayes

ATTORNEY

Aug. 21, 1951 J. H. GUENTHER 2,564,687

PULSE TIME MODULATION

Filed March 26, 1946 3 Sheets-Sheet 2

INVENTOR
JOHN H. GUENTHER

BY M. A. Hayes

ATTORNEY

PULSE TIME MODULATION

Filed March 26, 1946

3 Sheets-Sheet 3

INVENTOR
JOHN H. GUENTHER

BY McHayes
ATTORNEY

Patented Aug. 21, 1951

2,564,687

UNITED STATES PATENT OFFICE 2,564,387

PULSE TIME MODULATION

John H. Guenther, Philadelphia, Pa.

Application March 26, 1946, Serial No. 657,323

16 Claims. (Cl. 332—9)

(Granted under the act of March 3, 1883, as amended April 30, 1928; 370 O. G. 757)

This invention relates in general to electronic communication systems and in particular to pulse time modulators and detectors for such systems.

This invention is applicable generally to all types of communication systems and is particularly applicable to those systems which transmit intelligence by the use of pulse time modulation. The expression "pulse time modulation" as used in this specification indicates a means of communication whereby the radio carrier frequency is modulated with a series of pulses all having substantially the same amplitude and duration but being spaced one from the other by a variable time interval. This invention is applicable as a modulator for generating these variable spaced pulses and in a modified form as a demodulator for converting the pulses back to the original intelligence. In other modified forms this invention may be used as a discriminator detector for demodulating conventional frequency modulated signals, and the circuits of this invention may be used as a sweep generator for an oscilloscope or a synchroscope.

The general object of this invention is to provide new and novel circuits for use in pulse time modulation communication systems.

Another object of this invention is to provide means for generating a series of pulses having substantially constant amplitude and having the instantaneous time displacement between pulses correspond to the instantaneous amplitude of a variable amplitude voltage.

A further object of this invention is to provide means for demodulating a series of variable time spaced pulses.

A still further object of this invention is to provide new and novel circuits for demodulating conventional frequency modulated signals.

Another object of this invention is to provide new and novel means for generating a voltage having a sawtooth waveform.

Other and further objects of this invention will be apparent from the following specification when taken with the accompanying drawings in which.

The above mentioned drawings show various modifications of the invention and illustrate its use in combination with various systems as mentioned previously. For clarity, all similar parts of the various figures are designated by the same reference numbers. It is to be understood that the various modifications and uses described herein are representative only and that various other modifications and uses as will be apparent to those versed in the art are within the scope of this invention.

Figure 1:
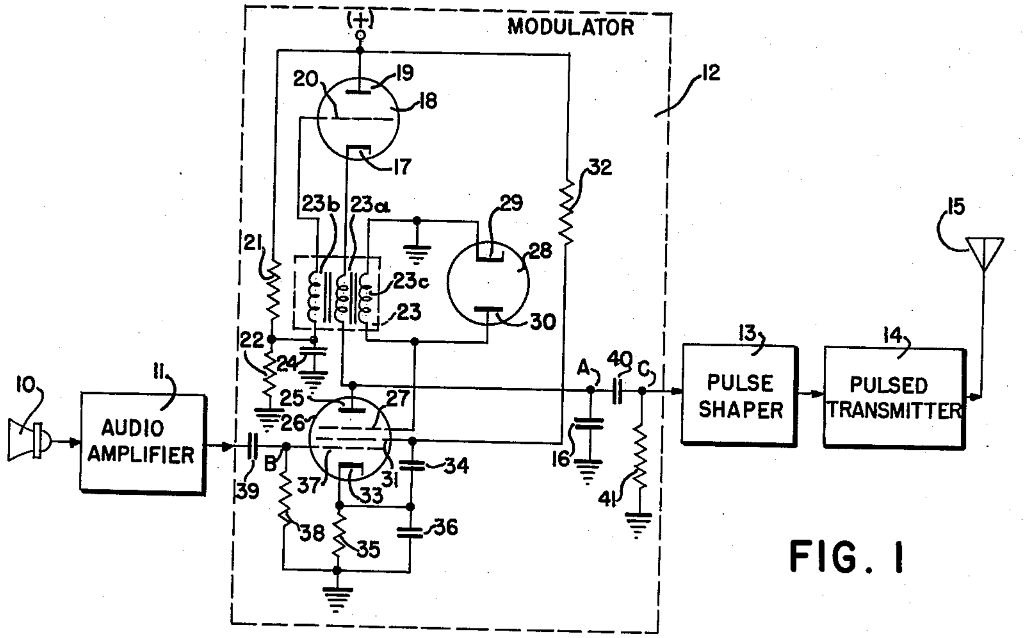
Fig. 1 is a block diagram of a typical pulse transmitter showing schematically this invention used as a modulator.

The embodiment of the invention as shown in Fig. 1 is a typical pulse time modulation communications system comprising conventional microphone 10 and audio amplifier 11; modulator 12; and conventional pulse shaper 13, pulse transmitter 14, and antenna 15. Modulator 12 converts the audio voltage from amplifier 11 into a series of pulses of constant amplitude and variable time spacing; the instantaneous time spacing between pulses being proportional to the instantaneous amplitude of the audio voltage and the rate of change of the time spacing between pulses being proportional to the frequency of the audio voltage. These pulses, after being made the proper shape and time duration by pulse shaper 13, are used to trigger transmitter 14 which generates pulses of radio frequency energy corresponding to the pulses from modulator 12. Transmitter 14 is coupled to antenna 15 which propagates these radio frequency pulses into space.

Modulator 12 comprises a pulse generator, a condenser, and an electron discharge tube arranged to produce a sawtooth voltage waveform having approximately constant amplitude and variable slope. When the modulator is first energized there is no voltage across condenser 16 and thus cathode 17 of tube 18 is at zero potential. Plate 19 is connected to the positive supply voltage and grid 20 is energized with a positive voltage from the junction of voltage divider resistors 21 and 22 and therefore current will start to flow through tube 18. To complete the electrical circuit this current flows through winding 23*a* of transformer 23 and charges condenser 16.

This increasing current flowing through winding 23a generates a magnetic flux in the transformer which generates voltages across the terminals of the other two windings of transformer 23. Winding 23b is connected between grid 20 and the voltage divider 21—22 so that the voltage developed in the winding will add to or subtract from the normal positive voltage. Condenser 24 maintains the voltage on the divider constant and insures that the changes in voltage will be applied to grid 20. Winding 23b is wound in relation to 23a so that an increasing current through 23a will cause the potential on grid 20 to increase and cause more current to flow. Meanwhile condenser 16 charges and its potential approaches the supply potential which causes the voltage between plate and cathode of tube 18 to decrease. This continues until the potential across tube 18 becomes low enough to cause the rate of change of current through tube 18 to begin to decrease, at which time the flux in transformer 23 reverses and the potential on grid 20 decreases. Cathode 17 is now held at a positive voltage by the charge on condenser 16 and current stops flowing through tube 18. The potential across condenser 16 now is the supply voltage for plate 25 of tube 26 and condenser 16 discharges slowly through this tube, its rate of discharge depending upon the capacity of condenser 16 and the plate to cathode resistance of tube 26. As condenser 16 discharges the potential on cathode 17 of tube 18 decreases and finally reaches a value close enough to the potential on grid 20 to cause tube 18 to start to conduct. This starts the cycle again and thus a sawtooth waveform is generated across condenser 16. An idealized picture of this waveform is shown as curve I, Fig. 5.

To prevent the charging current of condenser 16 from flowing through tube 26 the third winding 23c of transformer 23 is connected between suppressor grid 27 and ground. This winding is oriented so that an increase in plate current through winding 23a develops a negative voltage on grid 27, which voltage is large enough effectively to cut off tube 26. Diode 28 is connected across winding 23c so that cathode 29 is grounded and plate 30 is connected to grid 27 of tube 26. This prevents grid 27 from going positive when tube 18 is cut off and also damps out any transient oscillations that may tend to occur in transformer 23.

Except for the plate and suppressor connections, tube 26 is connected as a conventional pentode tube with screen grid 32 energized through dropping resistor 32 and by-passed to cathode 33 by condenser 34, with cathode 33 grounded through bias resistor 35 and condenser 36, and with control grid 37 returned to ground through resistor 38 and energized with a control voltage through blocking condenser 39. The same operation is obtained if screen 31 is energized with a fixed potential instead of through a dropping resistor and the bias may be obtained from a negative supply on grid 37. It is obvious to those skilled in the art that tube 26 need not be limited to a pentode and also that tube 26 can be cutoff during the charging time of condenser 16 by methods other than the one shown.

Because the time of discharge of condenser 16 depends upon the plate resistance of tube 26 and because the plate resistance depends upon the control grid voltage, an audio voltage applied to control grid 37 will vary the discharge of condenser 16 at the applied audio rate. In operation, the free running frequency of the modulator is made higher than the highest audio frequency used by choosing the proper value for condenser 16. This allows condenser 16 to discharge at a nearly constant rate during any one cycle of operation but the discharge rate from cycle to cycle will vary with the applied audio frequency.

Figure 5:
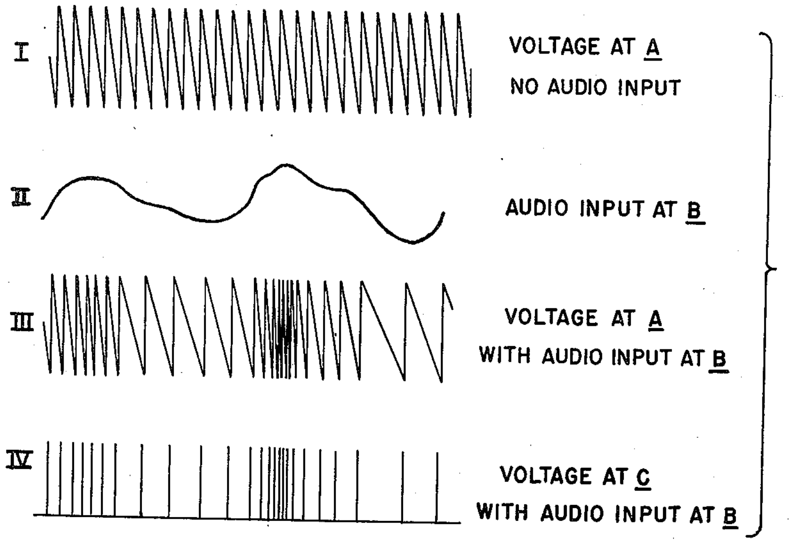
Fig. 5 shows idealized voltage waveforms of certain parts of Fig. 1.

Fig. 5 shows waveforms at various points of the circuit for an applied audio voltage. Curve II represents an audio voltage at point B, Fig. 1, and curve III represents the varying sawtooth voltage obtained at point A, Fig. 1. When this voltage is coupled through the differentiating circuit comprising condenser 40 and resistor 41 an output is obtained at point C which is a series of positive pulses of constant amplitude and variable time spacing as shown in curve IV, Fig. 5. These pulses may be used directly to pulse transmitter 14 or they may be shaped and changed in duration by shaper 13, depending upon the design requirements of transmitter 14.

The output from modulator 12 need not be taken from point C but may be taken from other points in the circuit (positive pulses are available at grid 20 of tube 18 and negative pulses are available at grid 27 of tube 26).

Figure 2:
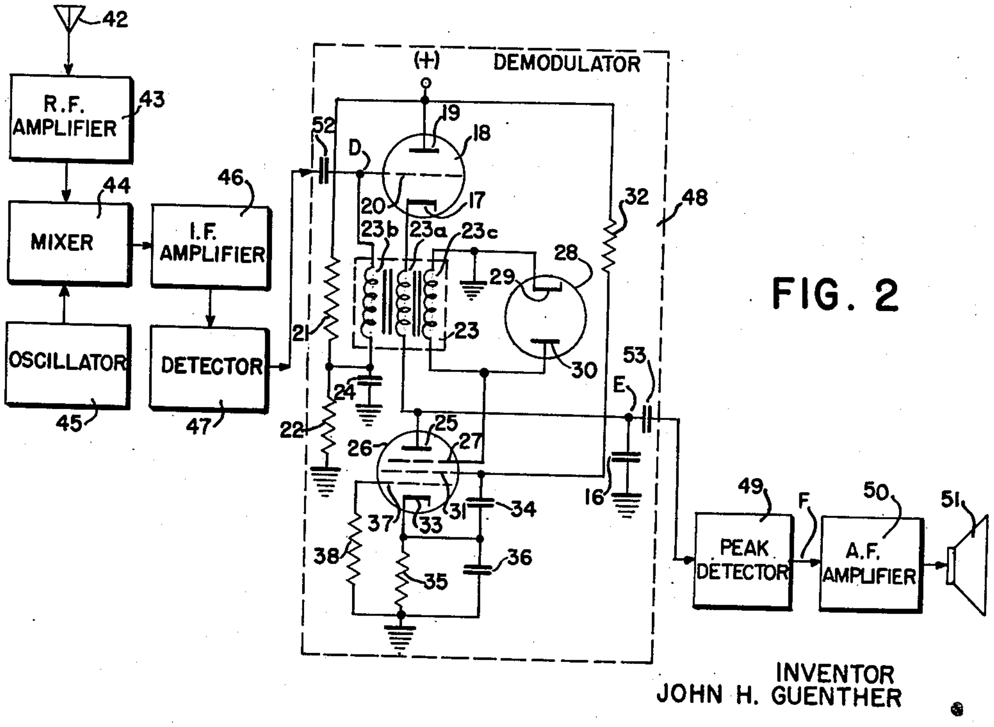
Fig. 2 is a block diagram of a typical pulse receiver showing schematically this invention used as a demodulator.

The embodiment of the invention as shown in Fig. 2 is a typical superheterodyne pulse receiver for receiving the energy broadcast by the transmitter of Fig. 1 or a similar pulse transmitter. The transmitted radio frequency pulses are picked up by antenna 42, amplified by conventional amplifier 43 and coupled to mixer 44. There the R. F. pulses are mixed with the voltage from oscillator 45 and converted to intermediate frequency pulses which are coupled to and amplified by I. F. amplifier 46. When the pulses are amplified to a convenient level they are coupled to detector 47 the output of which is a series of positive pulses similar to those produced by modulator 12 of Fig. 1. Demodulator 48 and peak detector 49 of Fig. 2 convert these pulses back into the original audio voltage which is then amplified by amplifier 50 and applied to speaker 51.

Figure 6:
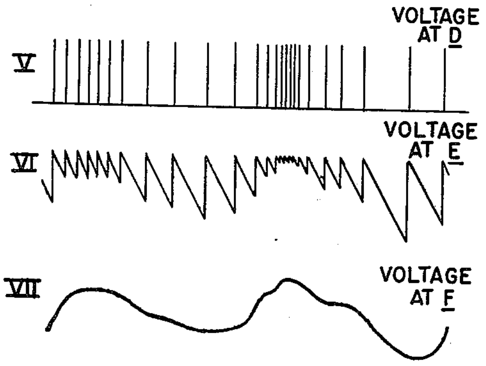
Fig. 6 shows idealized voltage waveforms of certain parts of Fig. 2.

Demodulator 48 of Fig. 2 is nearly identical with modulator 12 of Fig. 1, the main difference being the point of application of the signal voltage and the type of signal voltage applied. In Fig. 2 tube 26 has maintained a constant bias from resistor 35 and condenser 36 and therefore the rate of discharge of condenser 16 remains constant. The signal pulses from detector 47 are applied to grid 20 of tube 18 through coupling condenser 52 and each input pulse triggers the sawtooth oscillator. The normal discharge time of condenser 16 is now made longer than the longest time between any two input pulses so that the circuit normally will not trigger itself and cause spurious response. The operation is normally as explained before but now when a series of pulses, such as those represented by curve V of Fig. 6 are applied at point D, Fig. 2, the waveform of voltage across condenser 16 becomes a series of sawtooths having constant slope and varying amplitude, as shown by curve VI, Fig. 6. This voltage is applied to a conventional peak detector through coupling condenser 53 and the output from the detector is the original audio voltage, as curve VII, Fig. 6.

Figure 3:
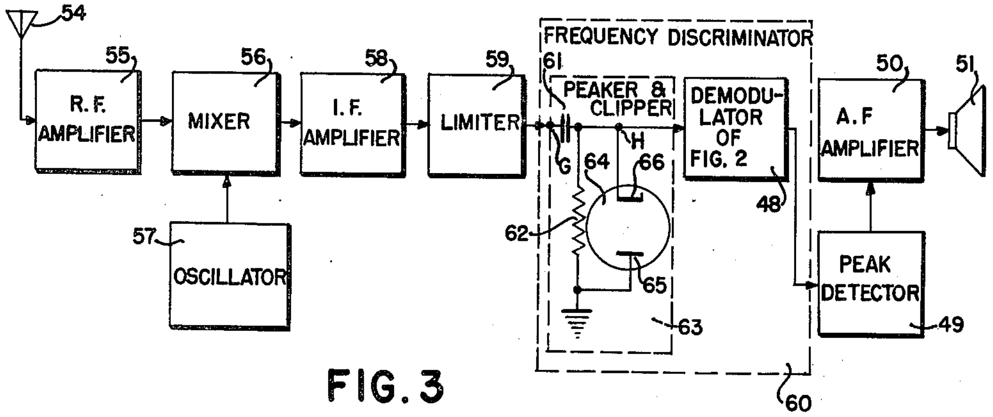
Fig. 3 is a block diagram of a typical frequency modulation receiver showing schematically this invention used as a discriminator.

Fig. 3 illustrates an embodiment of this invention in combination with conventional circuits to make a frequency modulation receiver. Conventional F. M. signals are picked up by antenna 54, amplified by R. F. amplifier 55 and coupled to mixer 56 where they are mixed with the voltage from oscillator 57 and converted to I. F. signals. These signals are further amplified by I. F. amplifier 58 and after attaining a suitable level are limited by conventional limiter circuits 59 which produce a frequency modulated square wave. These limited signals are coupled to discriminator 60 and peak detector 49 which abstract the audio components from the frequency modulated signal. The audio signal is then amplified by conventional amplifier 50 and applied to speaker 51.

Figure 7:
Fig. 7 shows idealized voltage waveforms of certain parts of Fig. 3.

The waveform of voltage at the input to discriminator 60 has the form shown in curve VIII, Fig. 7; that is, a frequency modulated square wave. These signals are applied to a differentiating circuit composed of condenser 61 and resistor 62 of the peaker and clipper circuit 63. Diode 64 is connected across resistor 62 so that plate 65 is grounded and cathode 66 is connected to condenser 61. The output from this circuit is a series of positive pulses, each corresponding to the leading edge of each square wave of signal. Diode 64 effectively removes the negative pulses that would be obtained at the trailing edge of each square wave. When a train of F. M. square waves such as shown in curve VIII, Fig. 7, are applied at point G of the discriminator a series of positive pulses as curve IX, Fig. 7 will be produced at point H. These pulses are coupled to the input of demodulator 48 which is the demodulator shown in Fig. 2 and as previously explained the output from peak detector 49 is then the audio component of the input signal.

Figure 4:
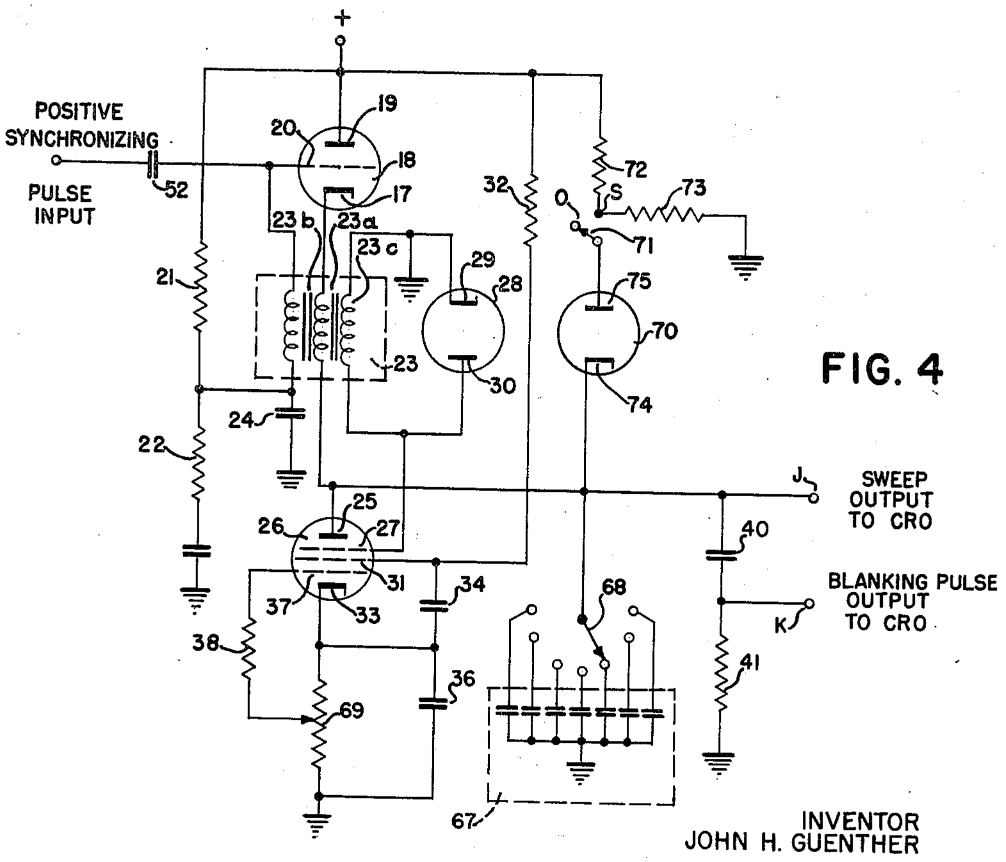
Fig. 4 is a schematic diagram of this invention showing its use as a sawtooth voltage generator.
Figure 8:
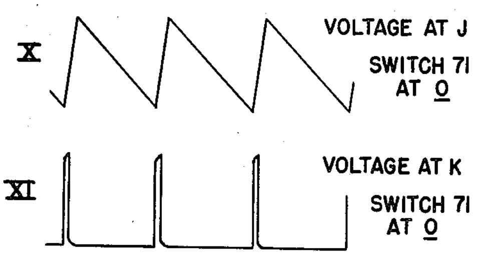
Fig. 8 and Fig. 9 show idealized voltage waveforms of certain parts of Fig. 4.

It is readily apparent from the previously described details that with a few minor changes this invention may be used as a sawtooth sweep generator for an oscilloscope or a synchroscope. As shown in Fig. 4, condenser 16 of the previous figures is replaced by the combination of condensers 67 and switch 68 and this combination constitutes a coarse frequency control for the system. To obtain a fine frequency control, the resistance of tube 26 is varied by varying the grid bias of that tube. This may be readily accomplished by substituting potentiometer 69 for resistor 35 of the previous figures. This circuit delivers a sawtooth voltage for the time base sweep at terminal J and a blanking pulse occurring during the charging time of the condenser at terminal K. Typical waveforms obtained at these terminals are shown in Fig. 8.

Figure 9:
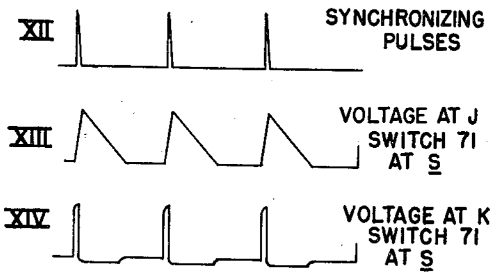

The addition of diode 70, switch 71, and the voltage divider resistors 72 and 73 convert the circuit into a sweep generator which will produce a sawtooth of voltage only when a trigger is applied to the synchronizing input terminal. Cathode 74 is connected to one side of the charging condenser as shown and plate 75 is connected to switch 71. When switch 71 is in position O, as shown, the circuit is not changed and operates in the normal fashion. When the switch is in position S plate 75 of diode 70 is connected to a positive voltage as determined by resistors 72 and 73. This voltage is made enough higher than the positive voltage on grid 20 of tube 18 to keep tube 18 cut off. When the selected condenser of bank 67 has discharged to a value such that cathode 74 is at the same potential as plate 75, the selected condenser will then charge through diode 70 at the same rate as it is discharging through tube 26 and the potential across the condenser will remain constant. As this voltage was adjusted to prevent tube 18 from conducting no new sweep will be produced until tube 18 is fired. Typical waveforms obtained at terminals J and K with switch 71 in position S and synchronizing pulses XII, Fig. 9 applied to the synchronizing input terminal are shown as curves XIII and XIV, Fig. 9.

The invention described herein may be manufactured and used by or for the Government of the United States of America for governmental purposes without the payment of any royalties thereon or therefor.

It is not intended that this invention be limited by the above specifications but is to be limited only by the following claims.

What is claimed is:

1. Apparatus for generating a sawtooth voltage waveform comprising a blocking oscillator including an electron tube; a condenser coupled to said pulse generator; means for charging said condenser during the cycle of conduction of said blocking oscillator; a second electron tube coupled to said condenser; means for discharging said condenser through said second electron tube during the period between cycles of conduction of said blocking oscillator, said period between cycles being determined by the rate of discharge of said condenser and said rate of discharge of said condenser being determined by the bias voltage applied to said second electron tube; and means for de-energizing said second electron tube during the period of said cycle.

2. Apparatus for generating a sawtooth voltage waveform comprising an electronic pulse generator including an electron tube having a plate, grid, and cathode; a charging condenser coupled to said electron tube; a source of positive potential connected to said plate of said electron tube; a transformer having three windings, one winding being connected between said grid of said electron tube and a second source of positive potential, and a second winding being connected between said cathode of said electron tube and a terminal of said charging condenser; and a second electron tube of the pentode type, the plate of said pentode tube being connected to said terminal of said charging condenser, the suppressor grid of said pentode tube being connected to one terminal of a third winding of said transformer and to the plate of a diode electron tube, the other terminal of said third winding of said transformer and the cathode of said diode tube being connected to a second terminal of said charging condenser and to the cathode of said pentode tube, the screen grid of said pentode tube being energized by said first source of positive voltage, the control grid of said pentode tube being energized from a variable negative voltage source, said three transformer windings being so oriented with each other to cause said condenser to charge and said pentode tube to de-energize during the period of a pulse from said generator and to cause said first electron tube to de-energize during the period between said pulses from said generator and allow said condenser to discharge through said pentode tube, the rate of discharge of said condenser being determined by said negative voltage applied to said control grid of said pentode tube and said period between pulses being determined by said rate of discharge of said condenser.

3. Apparatus for generating a sawtooth voltage waveform having approximately constant amplitude and having a variable repetition frequency comprising an electronic blocking oscillator, a condenser coupled to said blocking oscillator, means for charging said condenser during the period of a cycle of conduction of said blocking oscillator, an electron tube coupled to said condenser, means for discharging said condenser through said electron tube during the period between cycles of conduction of said blocking oscillator, a source of signal voltage, and means for applying a voltage from said source to bias said tube to vary the rate of discharge of said condenser in accordance with the amplitude of said voltage from said source.

4. Apparatus for generating a sawtooth voltage waveform having approximately constant amplitude and having a variable repetition frequency comprising an electronic blocking oscillator; a condenser coupled to said blocking oscillator; means for charging said condenser during the period of a cycle from said blocking oscillator; an electron tube coupled to said condenser; means for discharging said condenser through said electron tube during the period between cycles of conduction of said blocking oscillator, said period between cycles being determined by the rate of discharge of said condenser and said rate of discharge of said condenser being determined by the bias voltage applied to said electron tube; and a source of electrical signal voltage, and means for applying a voltage from said source to bias said electron tube to vary the rate of discharge of said condenser in accordance with the amplitude of said signal voltage from said source.

5. Apparatus for generating a series of pulses having approximately constant amplitude and having a variable period between pulses comprising an electronic blocking oscillator, a condenser coupled to said blocking oscillator, means for charging said condenser during the period of a cycle of conduction of said blocking oscillator, an electron tube coupled to said condenser, means for discharging said condenser through said electron tube during the period between cycles of conduction of said blocking oscillator, a source of electrical signal voltage, means applying a voltage from said source to bias said tube to vary the rate of discharge of said condenser in accordance with the amplitude of said voltage from said source and means for differentiating the potential of charge on said condenser to derive said pulses.

6. Apparatus for generating a sawtooth voltage wave form comprising an electronic pulse generator including an electron tube having a plate, grid, and cathode; a charging condenser coupled to said electron tube; a source of positive potential connected to said plate of said electron tube; a transformer having three windings, one winding being connected between said grid of said electron tube and a second source of positive potential, and a second winding being connected between said cathode of said electron tube and a terminal of said charging condenser; and a second electron tube of the pentode type, the plate of said pentode tube being connected to said terminal of said charging condenser, the suppressor grid of said pentode tube being connected to one terminal of a third winding of said transformer and to the plate of a diode electron tube, the other terminal of said third winding of said transformer and the cathode of said diode tube being connected to a second terminal of said charging condenser and to the cathode of said pentode tube, the screen grid of said pentode tube being energized by said first source of positive voltage, means for biasing the control grid of said pentode tube, said transformer windings being so oriented with each other to cause said condenser to charge and said pentode tube to deenergize during the period of a pulse from said generator, and means for deriving an output wave from said charging condenser.

7. In combination with a pulsed radio transmitter, a pulse time modulator comprising, apparatus for generating a series of voltage pulses having approximately constant amplitude and having a variable time spacing, said apparatus comprising an electronic blocking oscillator, a condenser coupled to said oscillator, means for charging said condenser during the period of a cycle of conduction of said blocking oscillator, an electron tube coupled to said condenser, means for discharging said condenser through said electron tube during the period between cycles of conduction of said blocking oscillator, a source of electrical signal voltage and means for applying a voltage from said source to bias said electron tube to change the rate of discharge of said condenser in accordance with the amplitude of said voltage from said source.

8. In a pulse time modulation system apparatus for generating a series of pulses having variable time spacing, said apparatus comprising means for generating a sawtooth voltage wave form, said last-mentioned means including a blocking oscillator, a condenser coupled to said blocking oscillator, means for charging said condenser during the period of cycles of conduction of said blocking oscillator, means for discharging said condenser during the period between cycles of conduction of said oscillator and means for varying the frequency of said blocking oscillator.

9. In a pulse time modulation system apparatus for generating a series of electrical pulses for transmission having substantially constant amplitude and variable time spacing, said apparatus comprising in combination, an electrical signal voltage source, a sawtooth voltage wave form generator having an electronic blocking oscillator associated therewith, a condenser coupled to said blocking oscillator, means for charging said condenser during the period of the cycle of conduction of said blocking oscillator, an electron tube coupled to said condenser, means for discharging said condenser through said electron tube during the period between cycles of conduction of said blocking oscillator, the discharge rate of said condenser being adjustable in accordance with an applied electrical signal voltage from said source.

10. In a pulse time modulation signal system utilizing electrical pulses having substantially constant amplitude and variable time spacing, apparatus for generating a sawtooth voltage wave form comprising a source of modulating potential, a blocking oscillator including an electron tube, a condenser coupled to said pulse generator, means for charging said condenser during the period of conduction of said electron tube, a second electron tube coupled to said condenser, means for discharging said condenser through said second electron tube during the period of nonconduction of said first electron tube, said period between cycles of conduction of said first electron tube being determined by the rate of discharge of said condenser and said rate of discharge of said condenser being in turn determined by a potential applied to said second electron tube from said source.

11. In combination with a pulsed radio transmitter a pulse time modulator comprising, apparatus for generating a series of voltage pulses having approximately constant amplitude and having a variable time spacing, a condenser, an electronic blocking oscillator adapted for cyclic charging of said condenser, means for discharging said condenser during the period between cycles of charge of said blocking oscillator, said discharging means presenting a voltage sensitive controllable resistance, a source of electrical signal voltages, and means operative upon the application of a signal voltage from said source for varying said resistance.

12. Apparatus for generating a sawtooth voltage wave form comprising an electronic pulse generator including an electron tube having a plate, grid, and cathode, a charging condenser coupled to said electron tube, a source of positive potential connected to said plate of said electron tube, a transformer having three windings, one winding being connected between said grid of said electron tube and a second source of positive potential, and a second winding being connected between said cathode of said electron tube and a terminal of said charging condenser, and a second electron tube of the pentode type, the plate of said pentode tube being connected to said terminal of said charging condenser, the suppressor grid of said pentode tube being connected to one terminal of a third winding of said transformer and to the plate of a diode electron tube, the other terminal of said third winding of said transformer and the cathode of said diode tube being connected to a second terminal of said charging condenser and to the cathode of said pentode tube, the screen grid of said pentode tube being energized by said first source of positive voltage, means for biasing the control grid of said pentode tube, said transformer windings being so oriented with each other to cause said condenser to charge and said pentode tube to de-energize during the period of a pulse from said generator, said diode acting to ground said suppressor grid and to damp transient oscillation in said transformer during the period between pulses from said generator, and means for deriving an output wave from said charging condenser.

13. In a pulse time modulation system including a pulse shaping network and a pulsed radio frequency transmitter, apparatus for generating a series of electrical pulses for transmission having substantially constant amplitude and variable time spacing, said apparatus comprising in combination, an electronic pulse generator including an electron tube having a plate, grid, and cathode, a charging condenser coupled to said electron tube, a source of positive potential connected to said plate of said electron tube, a transformer having three windings, one winding being connected between said grid of said electron tube and a second source of positive potential, and a second winding being connected between said cathode of said electron tube and a terminal of said charging condenser, and a second electron tube of the pentode type, the plate of said pentode tube being connected to said terminal of said charging condenser, the suppressor grid of said pentode being connected to one terminal of a third winding of said transformer and to the plate of a diode electron tube, the other terminal of said third winding of said transformer and the cathode of said diode tube being connected to a second terminal of said charging condenser and to the cathode of said pentode tube, the screen grid of said pentode tube being energized by said first source of positive voltage, a source of modulating voltage signals, means for applying voltage from said signal source to the control grid of said pentode tube to vary the rate of discharge of said condenser in response to amplitude of said modulating signal voltage, said transformer windings being so oriented with each other to cause said condenser to charge and said pentode tube to de-energize during the period of a pulse from said generator, means for deriving an output wave from said charging condenser, means to differentiate said output wave to produce constant amplitude variable time spaced pulses, and means to apply said pulses to pulse modulate said radio frequency transmitter.

14. Apparatus for generating a sawtooth voltage wave form comprising, an electron tube blocking oscillator, a condenser coupled to said blocking oscillator and adapted to be charged by the conduction of said electron tube to bias said electron tube to nonconduction, a second electron tube coupled to said condenser and adapted to discharge the charge on said condenser, a source of modulating electrical signal voltages, means for applying a voltage from said source to bias said second electron tube to vary the rate of discharge of said condenser as a function of the amplitude of said voltage, means for applying a voltage from said blocking oscillator to bias said second tube to non-conduction during the conduction of said first-named electron tube and means for deriving an output voltage wave from said condenser.

15. In a pulse time modulating system, apparatus for generating a series of electrical pulses for transmission having substantially constant amplitude and variable time spacing comprising an electron tube blocking oscillator, a condenser coupled to said blocking oscillator and adapted to be charged by the conduction of said electron tube to bias said electron tube to nonconduction, a second electron tube coupled to said condenser and adapted to discharge said condenser, a source of modulating electric signal voltage, means applying a voltage from said source to bias said second electron tube to vary the rate of discharge of said condenser as a function of the amplitude of said signal voltage, means for applying a voltage from said blocking oscillator to bias said second tube to nonconduction during the conduction of said first-named electron tube, and means for differentiating the potential of the charge on said condenser to form substantially constant amplitude variable time spaced voltage pulses.

16. In a pulse time modulating system including a pulse shaping network and a pulsed radio frequency transmitter, a modulator for generating a series of electrical pulses for transmission having substantially constant amplitude and a time spacing variable in accordance with the amplitude of the modulation signal comprising, an electron tube blocking oscillator, a condenser coupled to said blocking oscillator and adapted to be charged by the conduction of said electron tube to bias said electron tube to nonconduction, a second electron tube coupled to said condenser and adapted to discharge said condenser, a source of modulating electric signal voltage, means applying a voltage from said source to bias said second electron tube to vary the rate of discharge of said condenser as a function of the amplitude of said signal voltage, means for applying a voltage from said blocking oscillator to bias said second tube to nonconduction during the conduction of said first-named electron tube, and means for differentiating the potential of the charge on said condenser to form substantially constant amplitude variable time spaced voltage pulses for application to pulse modulate said transmitter.

JOHN H. GUENTHER.

(References on following page)

REFERENCES CITED

The following references are of record in the file of this patent:

UNITED STATES PATENTS

| Number | Name | Date |
|---|---|---|
| 2,155,210 | Young | Apr. 18, 1939 |
| 2,172,746 | Young | Sept. 12, 1939 |
| 2,239,757 | Sanders | Apr. 29, 1941 |
| 2,262,407 | Rath | Nov. 11, 1941 |
| 2,357,398 | Gray | Sept. 5, 1944 |
| 2,361,766 | Hadekel | Oct. 31, 1944 |
| 2,392,546 | Peterson | Jan. 8, 1946 |
| 2,410,920 | Atwood | Nov. 12, 1946 |
| 2,416,292 | Doddington | Feb. 25, 1947 |
| 2,416,305 | Grieg | Feb. 25, 1947 |
| 2,419,535 | Chatterjea et al. | Apr. 29, 1947 |
| 2,425,316 | Dow | Aug. 12, 1947 |
| 2,428,926 | Bliss | Oct. 14, 1947 |
| 2,441,963 | Gray | May 25, 1948 |
| 2,444,437 | Grieg | July 6, 1948 |
| 2,466,230 | Goldberg | Apr. 5, 1949 |